United States Patent [19]

Covey

[11] Patent Number: 4,814,889
[45] Date of Patent: Mar. 21, 1989

[54] AUTOMATIC FOCUSSING SYSTEM

[75] Inventor: Robert L. Covey, Hightstown, N.J.

[73] Assignee: General Electric Company, Schenectady, N.Y.

[21] Appl. No.: 105,411

[22] Filed: Oct. 7, 1987

[51] Int. Cl.$^4$ .......................... H04N 5/232; G03B 3/00
[52] U.S. Cl. ..................................... 358/227; 354/402
[58] Field of Search ............... 354/400, 402, 403, 404, 354/405, 406, 407, 408; 358/227

[56] References Cited

U.S. PATENT DOCUMENTS

| | | | |
|---|---|---|---|
| 3,896,304 | 7/1975 | Aoki et al. | 354/402 |
| 4,183,642 | 1/1980 | Fukuoka | 354/402 |
| 4,333,007 | 6/1982 | Langlais et al. | 354/402 |
| 4,381,523 | 4/1983 | Eguchi et al. | 358/ |
| 4,382,665 | 5/1983 | Eguchi et al. | 354/ |
| 4,383,274 | 5/1983 | Inuiya | 358/ |
| 4,387,975 | 6/1983 | Araki | 354/408 |
| 4,392,726 | 7/1983 | Kimura | 354/ |
| 4,422,097 | 12/1983 | Inuiya | 358/ |
| 4,445,761 | 5/1984 | Ishikawa et al. | 354/402 |
| 4,470,676 | 9/1984 | Kinoshita et al. | 354/ |
| 4,484,225 | 11/1984 | Bishop | 358/ |
| 4,484,806 | 11/1984 | Onishi et al. | 354/ |
| 4,500,925 | 2/1985 | Hanma et al. | 358/ |
| 4,544,953 | 10/1985 | Goldman | 358/ |
| 4,561,747 | 12/1985 | Ohno et al. | 354/402 |
| 4,584,704 | 4/1986 | Ferren | 354/400 |
| 4,591,919 | 5/1986 | Kaneda et al. | 354/402 |
| 4,608,490 | 8/1986 | Nagasaki et al. | 354/406 |
| 4,611,244 | 9/1986 | Hanma et al. | 358/ |
| 4,616,264 | 10/1986 | Pshtissky | 358/ |
| 4,638,364 | 1/1987 | Hiramatsu | 358/ |
| 4,644,148 | 2/1987 | Kusaka et al. | 354/406 |
| 4,674,855 | 6/1987 | Utagawa | 354/403 |

OTHER PUBLICATIONS

IRI P256 Vision System Product Bulletin International Robomation/Intelligence 1982.
IRI P256 & P256X Vision System Programmer's Manuel Version 2.1A International Robomation/Intelligence 1985; cover page; i-viii; 3-1;3-12 to 3-16;4-22 to 4-24;4-26 to 4-38;4-42;4-57;4-60 to 4-65;4-70 to 4-76.

*Primary Examiner*—Russell E. Adams
*Attorney, Agent, or Firm*—William Squire; James C. Davis, Jr.; Paul R. Webb, II

[57] ABSTRACT

A video camera output signal is digitized by an analog-to-digital converter (ADC) and the digitized video frame stored in memory. The stored frame is high-pass spatially filtered and the filtering result is subjected to a non-linear point transform to suppress to zero less bright pixel samples. The grey scale values of the remaining pixels are summed to produce a summation value. Different focussed states have different summation values. The maximum summation value represents the point of optimum focus, and the system reaches the maximum value by changing the focus state of the optics, recomputing the grey scale sum and repeating the process until a global maximum grey scale summation value is reached, regardless of the initial focus state.

20 Claims, 5 Drawing Sheets

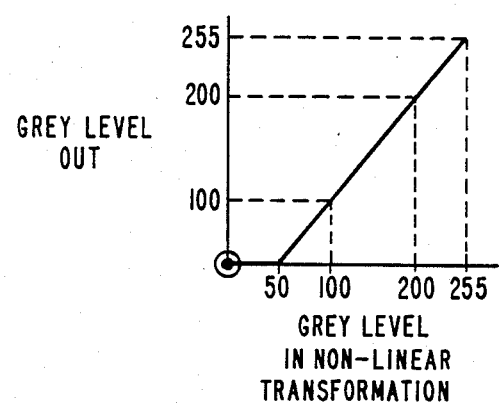
*Fig. 2*
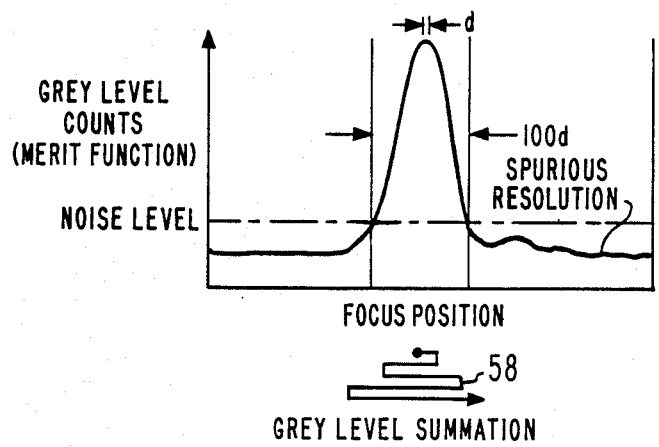
*Fig. 3*
*Fig. 4*

OBJECT     DIGITIZE & FIX     CONVOLUTION
            PICTURE IN MEMORY    (SHARPEN EDGES)

*a*     *b*     *c*

BEFORE TRANSFORMATION     AFTER TRANSFORMATION

*a*     *b*

- DARK PIXEL
- LIGHTEST PIXEL
- INTERMEDIATE SHADE OF GREY
- BLACK PIXEL (0 GREY SCALE VALUE)

AUTOMATIC FOCUSSING SYSTEM

This invention relates to automatic optical focussing systems, and in particular, to systems using a video camera.

Computer vision systems, which are commercially available, are used, among other uses, to assist factory automation. The vision systems are employed with video cameras to process the camera output video signals for different desired end purposes. For example, such vision systems may be employed for flaw detection, gauging, measurement systems for classification and sorting, process control, material handling, component inspections, robot guidance, machine monitoring and safety, general image processing and other applications. In a typical application employing a video camera and such a vision processing system, the video camera is required to be focussed upon the object and the signal from the camera processed by the vision system for the particular designated purpose. The focussing of the camera is outside the scope of the intended purpose of such a vision system.

Thus, the video camera needs to be focussed by other means, usually manually. While automatic focussing systems are known in the art, such focussing systems usually require additional circuit components and other apparatus. Vision processing systems are relatively expensive, are computer-programmed and are operated and utilized in conjunction with other computer systems. However, known automatic focussing systems tend to undesirably add cost to the vision system. For example, such automatic focussing systems may employ infrared emitters and sensors or split image lenses or still other kinds of additional apparatus as known in the art for focussing a given optical system. Such automatic focussing systems are disclosed by way of example in U.S. Pats. Nos. 4,616,264; 4,470,676; 4,392,726; 4,381,523; 4,484,806; 4,484,225; 4,500,925; 4,544,953; 4,611,244; 4,638,364 and 4,422,097.

The present inventor recognizes that it is advantageous to provide the least costly signal processing system in a factory environment for performing the measurement or other tasks employing a vision system. Therefore, a need is seen for an automatic focus control system which employs no additional optics and no additional electronics outside a simple motorized system for operating the optics of a commercially available video camera. In particular, a need is seen for an automatic focussing system which uses the present commercially available vision systems already in use for other purposes.

An automatic focussing system according to the present invention comprises imaging means for producing a signal representative of an image of an object spaced from the imaging means and having a given focussed state relative to the object. Signal processing means generate a grey scale summation value of at least a portion of the image. The processing means distort the grey scale values of the image so that the summation value tends to be a function of the focussed state of the imaging means. Means periodically displace the imaging means and cause the processing means to produce successive grey scale summation values representing successive different corresponding focussing states of the imaging means. Comparison means compare the successive summation values and cause the imaging means to be placed in a focussed state in which the grey scale summation values of the successive focussing states increase to a maximum.

IN THE DRAWINGS

FIG. 2 is a block representation indicating a convolution algorithm for performing a convolution operation on a digital video image;

FIG. 3 is a curve representing non-linear grey scale transformation of a digitized video image;

FIG. 4 is a graph illustrating the relative variation of grey level summation of all the pixels in a given video image relative to the focussed position of the imaging optics;

Figure 1:
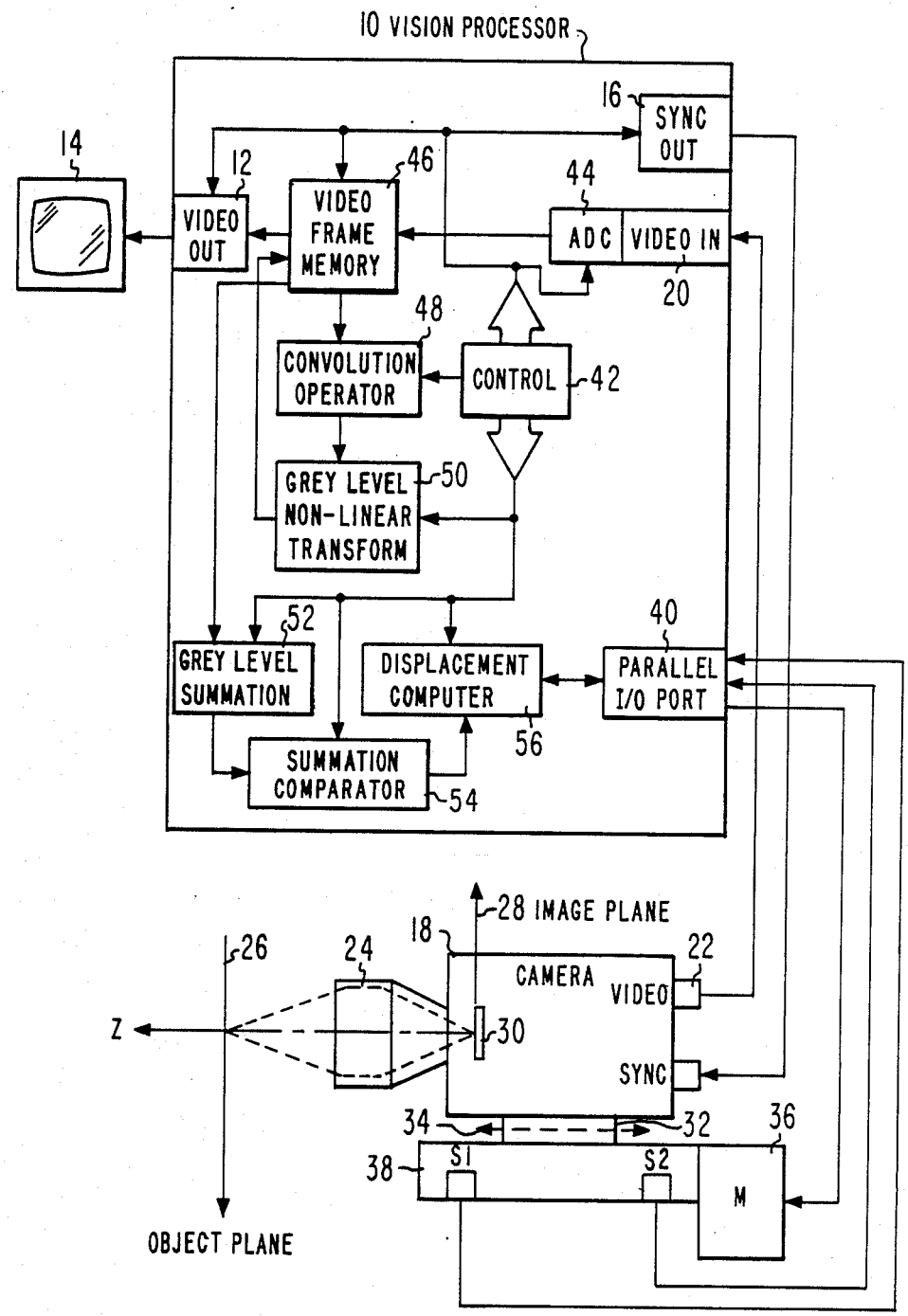
FIG. 1 is a block diagram of an automatic focussing system according to one embodiment of the present invention.

In FIG. 1 vision processor 10, is of a type such as is commercially available and has a video output port 12 which supplies a video signal to a television raster scan monitor 14, also of a type such as is commercially available. Processor 10 includes means 16 for providing a video sync output signal which is applied as an input to video camera 18. The processor 10 has a video input port 20 which receives a standard video signal from camera 18 at its output port 22. Camera 18 is a commercially available standard system having optics 24 which project an image of an object located in an object plane 26 to an image plane 28. An image sensor 30 is located at the image plane 28 for supplying the sensed image to the camera electronics which produce the video signal at output port 22. Sensor 30 may be a charge coupled device (CCD).

The camera 18 is mounted on a table 32 shown schematically in FIG. 1 which is displaceable relative to a support structure 38 in the directions 34 by a stepper motor 36. For example, table 32 may be secured to ways (not shown) which may slidably secure the table 32 to structure 38. Motor 36 is secured to the support structure 38 on which are a pair of spaced limit switches S1 and S2. Table 32 includes a device for tripping the switches S1 and S2 when the camera is at the leftmost and rightmost limits respectively of its motions in directions 34. Switches S1 and S2 are coupled to the parallel input/output (I/O) port 40 of processor 10 to indicate when the camera is at one of its limit positions in directions 34. The motor 36 control wires are also coupled to the parallel I/O port of processor 10.

Normally the optics 24 of camera 18 are not adjusted during operation, in which case the distance between the object plane 26 and the image plane 28 is non-variant. The optics 24, however, typically may be complex lenses whose focussing adjustment capability is not utilized in this embodiment. To focus on an object, the position of camera 18 is adjusted to bring the object into the object plane 26. The motor 36 including switches S1 and S2 serve to displace the camera 18 in back and forth directions 34 for this purpose. In the alternative, the focal length of the optics 24 may be changed by a motor (not shown) to change the focus. That is, the lenses of optics 24 may be adjusted to alter the relative positions of the object and image planes to the optics. In this case, motor 36 is not utilized and a second motor (not shown) is coupled to adjust the optics 24 in place of displacing the camera 18.

The vision processor 10 is a computer programmed system whose different functions are controlled by one or more specific computer programs written according to the vision processor 10 manufacturer's instructions. The processor 10 generally performs the desired functions in any sequence as programmed. In the present case, processor 10 is programmed to perform its desired operations as described below herein. The processor 10 is programmed to provide in response to the video signal applied at the input port 20 suitable control signals to motor 36. Motor 36 displaces the camera 18 in directions 34 until the object plane 36 is coincident with the points on the object being viewed. The processor 10 automatically processes the video signal output from camera 18 and causes the camera to focus on the object without additional structure outside the vision processor and the camera support displacement structure just described. No additional optics, sensors or other control systems are required. The vision processor 10, in addition to the focussing operation for the camera 18, also performs the desired image processing for which it is normally used. Such image processing includes measurement, robotic control or other functions as outlined in the introductory portion herein. This results in a compact system for all of the operations necessary for both focussing and processing the image according to a given implementation.

Figure 5:
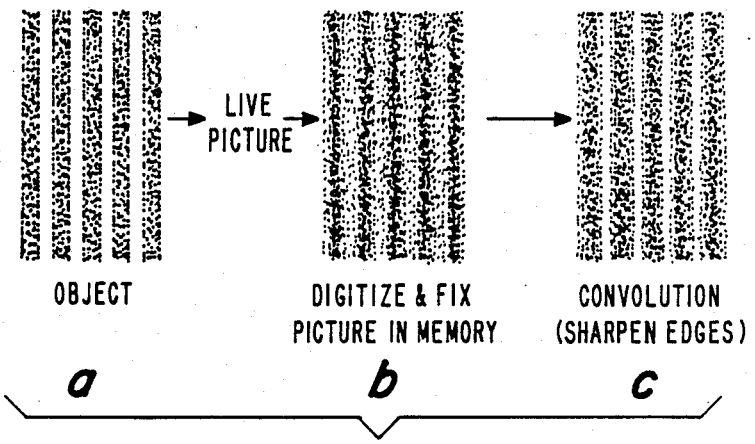
FIGS. 5a, 5b and 5c illustrate different stages of image processing performed by the system of FIG. 1.

According to the present embodiment, the camera 18 and processor 10 are intended to evaluate and focus on an object comprising spaced parallel lines of a given width as shown in FIG. 5a. Such lines, in this instance, by way of example, are the phosphor grid deposited on a conventional television picture tube face. Such lines need to be measured and otherwise inspected by the system of FIG. 1. However, the processor 10 and camera 18 may be employed for evaluating any number of other different systems according to a given desired implementation.

All of the functions to be described contained within vision processor 10 are within the capability of a commercially available general purpose vision processor. One such processor is the IRI P256 vision system manufactured by International Robomation/Intelligence. However, there are additional capabilities of such a commercially available vision processor which are not used for the purpose of automatic focussing.

The vision processor 10 includes a control 42 which is programmed by the system user so that all of the functions as to be described are performed in the desired sequence. An analog-to-digital converter 44 digitizes the video signal from the video input port 20. The digitized video signal is supplied to a video frame memory 46 which stores the live picture received from the input port 20, one digitized frame at a time. The memory 46 is instructed to store the image in an area of 256 pixels×256 pixels. The processor 10 includes means (not shown) for selecting a windowed portion of the live video picture or the entire picture which is to be stored in the memory 46. The image stored in memory 46 is stored under control of control 42. The stored image is a snap shot of the live image received at port 20. The image is changed according to the computer program under instructions of control 42. The program is entered into the system with a computer keypad (not shown).

The pixels in frame memory 46 are each processed individually in accordance to the operation then being performed.

The image from memory 46 is applied to and operated on by convolution operator 48. Operator 48 performs a 7×7 matrix convolution as illustrated in FIG. 2. In FIG. 2 each pixel in a given 7×7 matrix is multiplied by a multiplier as shown. The summation of all the multipliers in FIG. 2 is 0. The grey scale value of the central pixel within the region of the convolution matrix of FIG. 2 is replaced with a summation value of all of the operators of FIG. 2. That is, the summation of all the operators of FIG. 2 are employed to create a new pixel grey scale value for the centermost pixel of the 7×7 matrix. This operation, which is a two-dimensional convolution, is performed in turn on each and every pixel in the image. The grey scale range for each of the pixels is from 0 to 255 with 8 bits per pixel. The convolution of FIG. 2 is more generally referred to as a high-pass spatial image filter, i.e., a Laplacian cross convolution. The convolutional high-pass filtering replaces every pixel in the image with a linear summation over the 7×7 matrix region surrounding that pixel according to the equation:

$$Q(i,j) = \sum_{(h,k)=-(n-1)/2}^{+(n-1)/2} \sum C(h,k)*P(i+h, j+k) \quad (1)$$

for all (i, j), and all (h,k) in an n×n region (n−1) surrounding (i, j), where i and h are pixel row number, j and k are pixel column number, P is the original image pixel, Q is the image pixel resulting from the convolution, n is an odd integer, and C is the coefficient matrix defining the convolution. The matrix region surrounding the pixel P is centered on P, and may be any region which includes the same odd number of pixels in both the x and y directions.

The result of the convolutional high-pass filtering of the image is to sharpen the image, that is, to edge enhance the image. The edge enhancement is illustrated in FIG. 5c whereas FIG. 5b illustrates the digitized fixed out of focus picture prior to convolution. In essence, the convolution process takes a derivative of the digitized image and forms a new image.

It should be emphasized that the convolution operator has a resolution of a grey scale valuation in the range of 0 to 255 and that a specific valuation in that range is assigned every pixel in the image being operated upon. The so processed signal is applied to the grey level non-linear transform 50.

Transform 50 defines a point transform wherein every pixel in the image is replaced by an arbitrary function 5 of that pixel according to equation 2.

$$Q(i,j) = F[P(i,j)] \quad (2)$$

for all (i,j), where P is the original pixel and Q is the resultant pixel.

The non-linear transform 50 performs the operation as graphically depicted in FIG. 3. What this transform process does in this example is reduce to 0 (black) the grey scale value of every pixel in the image stored in memory 46 which has a grey scale value below a given threshold. In this embodiment that threshold has a grey scale value of 50 or less. The grey scale value of every other pixel image which is above 50 is kept intact and does not change in value. That is, for the grey scale values above 50 the transformation is linear with respect to those values. This operation is sometimes referred to as "image coring".

Figure 6:
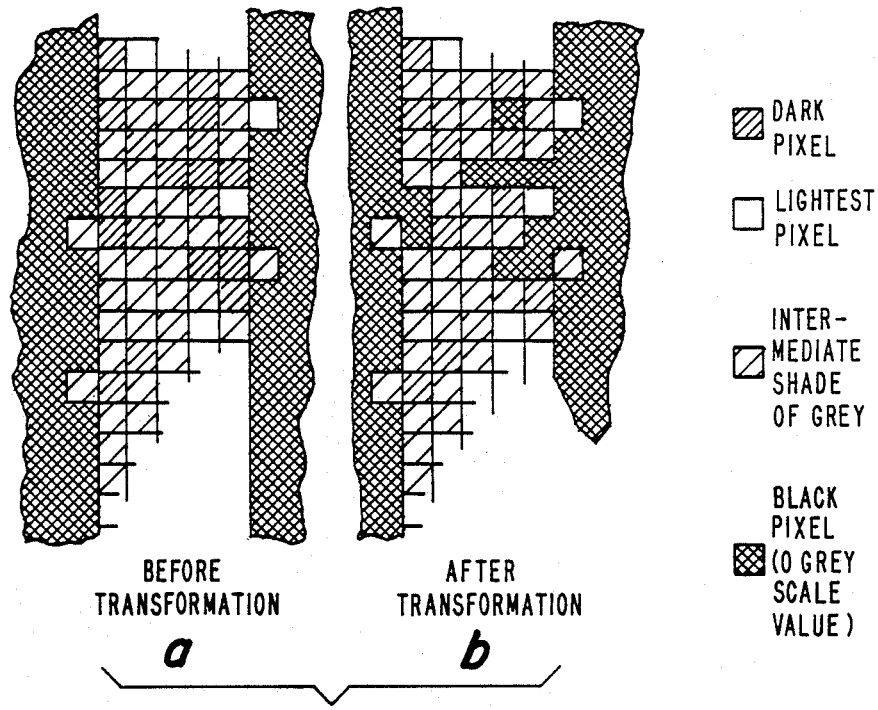
FIGS. 6a and 6b show before and after illustrations of non-linear transformation of the grey scale pixel values the image of FIG. 5c.

The convoluted image is illustrated in FIG. 6a wherein each square represents a given pixel having a given grey scale value. The lighter the pixel, the higher grey scale value, whereas the most deeply shaded pixels have the lowest grey scale values. It is assumed the lowest grey scale values, i.e., the most heavily shaded pixels in FIG. 6a, are below the threshold of 50 in this grey scale range. The value of those pixels is reduced to zero and are illustrated as crosshatched regions representing black pixels of zero grey scale value, FIG. 6b. Therefore, the convoluted transformed image of FIG. 6b comprises pixels whose grey scale values are over 50. The threshold value of 50 for the transformation is not critical and other values may be used. The border of the image is black so its grey scale values are not a factor.

In one given implementation employing image processing according to the present invention, the grey scale threshold of 50 was found to be the optimum point. However, for other images having different variations in grey scale variations other thresholds may be found to be optimum. Those threshold that are optimum are those for which focussing can be achieved in the manner to be described below. In the present case, the threshold value of the grey scale levels of 50 or below was found to be acceptable in achieving focussing.

In FIG. 3, the curve represents a monotonically non-decreasing relationship of the input grey scale value to the output grey scale value. It is important that these relationships of input levels to output levels be non-linear. By suppressing the low grey scale values to zero, the significant non-focussed pixels are suppressed. The non-linear monotonic increasing characteristic of the curve results in a sharper peak of the merit function curve of FIG. 4 which will be discussed in more detail below. However, the significance of the curve of FIG. 3 is not that the low grey scale values are suppressed but that the curve is monotonically non-decreasing and is non-linear.

Thus, other pixels may be suppressed or enhanced to produce a curve with those desired characterstics. For example, the pixels in the 100–200 grey scale range may be altered in value to produce a curve which has a knee in the 100–200 grey scale range. The curve in this case is linear from 0 to 100 grey scale value but has a horizontal transition between 100 to 200 that forms a concave region that gradually curves upward to the 200 input-output level and then continues linearly to the 255 input-output level. Other point transform characteristics are possible utilizing these principles which result in a peaked merit function curve of the type illustrated in FIG. 4. In the case of pixel enhancement, the pixels in the 200–255 input grey scale range can be transformed to a 255 grey scale output level. The curve is linear between 0 and 200 input-255 output level and has a horizontal leg at the 255 output level. The entire curve is therefore always non-linear and is monotonically non-decreasing.

The convolution operator 48 and a non-linear transfrom 50 for image coring are both well known, per se, in the prior art. They are readily available functions among many other functions in commercially available vision processors. Operator 48 and transform 50 are programmed into the system to perform the operations in the sequence as described. The programming is within the skill of one of ordinary skill in the programming art.

The output of the grey scale non-linear transform 50, FIG. 1, is applied to the frame memory 46 in which the grey scale value of every pixel in memory 46 is replaced with the transformed grey scale values of the transform 50 output. After the transformation is completed, every pixel in the frame memory 46 has grey scale level values of zero (black), or between 50 and 255.

These values are then summed by grey level summation 52. Summation 52 is a arithmetic processor which sums the numerical assigned values of the grey scale levels of every pixel in memory 46. The grey level summation produced by summation 52 is a single numerical value representing the sum of all such grey scale levels of all pixels. That value is applied to the summation comparator 54.

Comparator 54 stores that summation value and processes it in the manner to be described. At initial start up that value is supplied to displacement computer 56. The displacement computer generally processes the summation value and issues commands after processing to displace camera 18 in the appropriate direction and amplitude in a manner to be described. Comparator 54 compares that summed value to determine whether or not that value is above a given noise level which is predetermined to be present even if all of the grey scale values are zero. FIG. 4 is a plot of summation values over a range of in-focus and out-of-focus positions. The grey level summation value of a given digitized transformed image is assigned the term "merit function." The relatively narrow merit function peak represents the in-focus portion. It is this peak that is sought in focussing the system. The noise level is shown by the broken line. If the displacement computer 56 determines that the summation value in comparator 54 for the initial video frame is below the noise level, it causes the system to continue to search for the grey scale peak value within the region labeled 100d.

Figure 7:
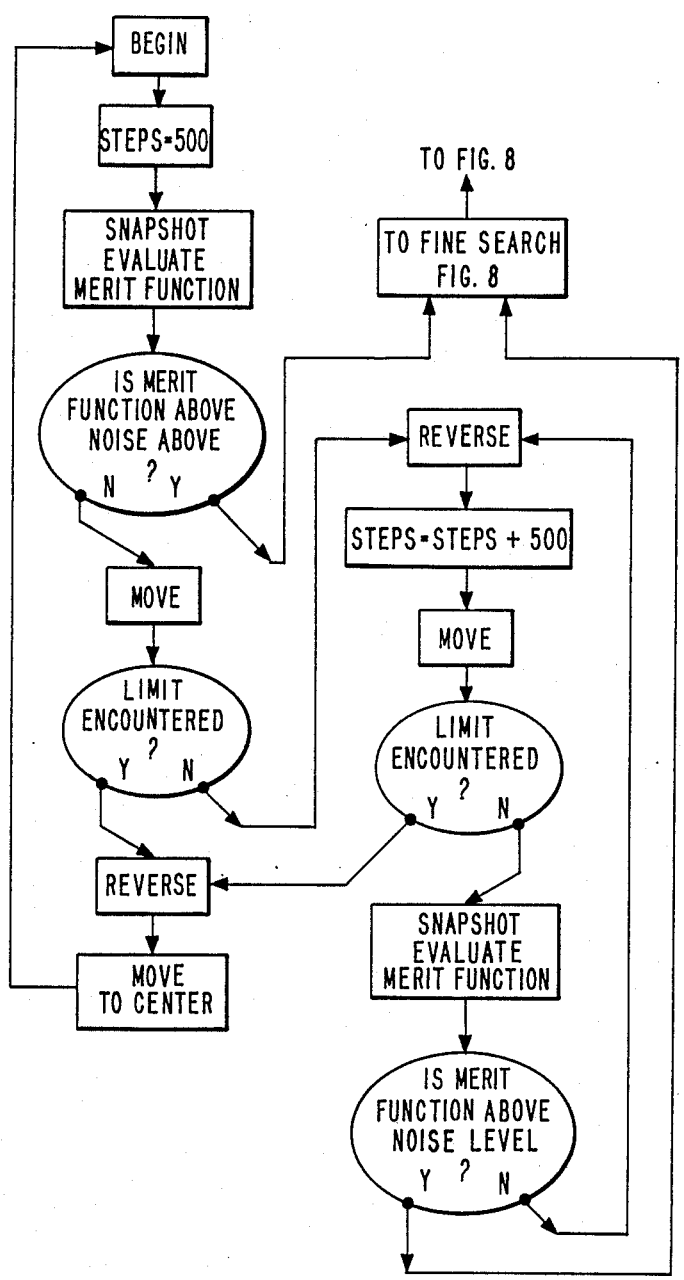
FIGS. 7 and 8 are methodology flow charts illustrating the steps in focusing the system of the embodiment of FIG. 1.

In FIG. 7, if the grey scale summation value, i.e., the merit function, is not above the noise level, then the focussing system is so out of focus that a range close to focus must first be found. Therefore, the displacement computer causes the motor 36 to displace. It displaces the camera in 500 steps of motor 36. If one of the limit switches S1 or S2 of FIG. 1 is activated during the first 500 step motion the system determines that the motion should be reversed in direction and centers the camera between switchs S1 and S2. A second snapshot is taken of the live video image at the center position between the switches S1 and S2. The first prior image in memory 46 is erased and the new digitized live image is fixed in memory. The digitized image is convolved, non-linear transformed and the grey level summed. The displacement computer determines whether or not that summation value is above or below the noise level of FIG. 4. If the merit function is still not above the noise level, the motor is moved 500 steps and the process repeated.

If the value is still below the noise level, the motor then reverses direction as illustrated by the zig-zag path 58 in FIG. 4. In the reverse motion the motor is moved in the opposite direction to a new position of an incremental amount of 500 additional steps or a total of 1000 steps. If not above the noise level, the system reverses direction again moving an additional 500 steps or 1500 steps in all and so on until the merit function is above the noise level.

Figure 8:
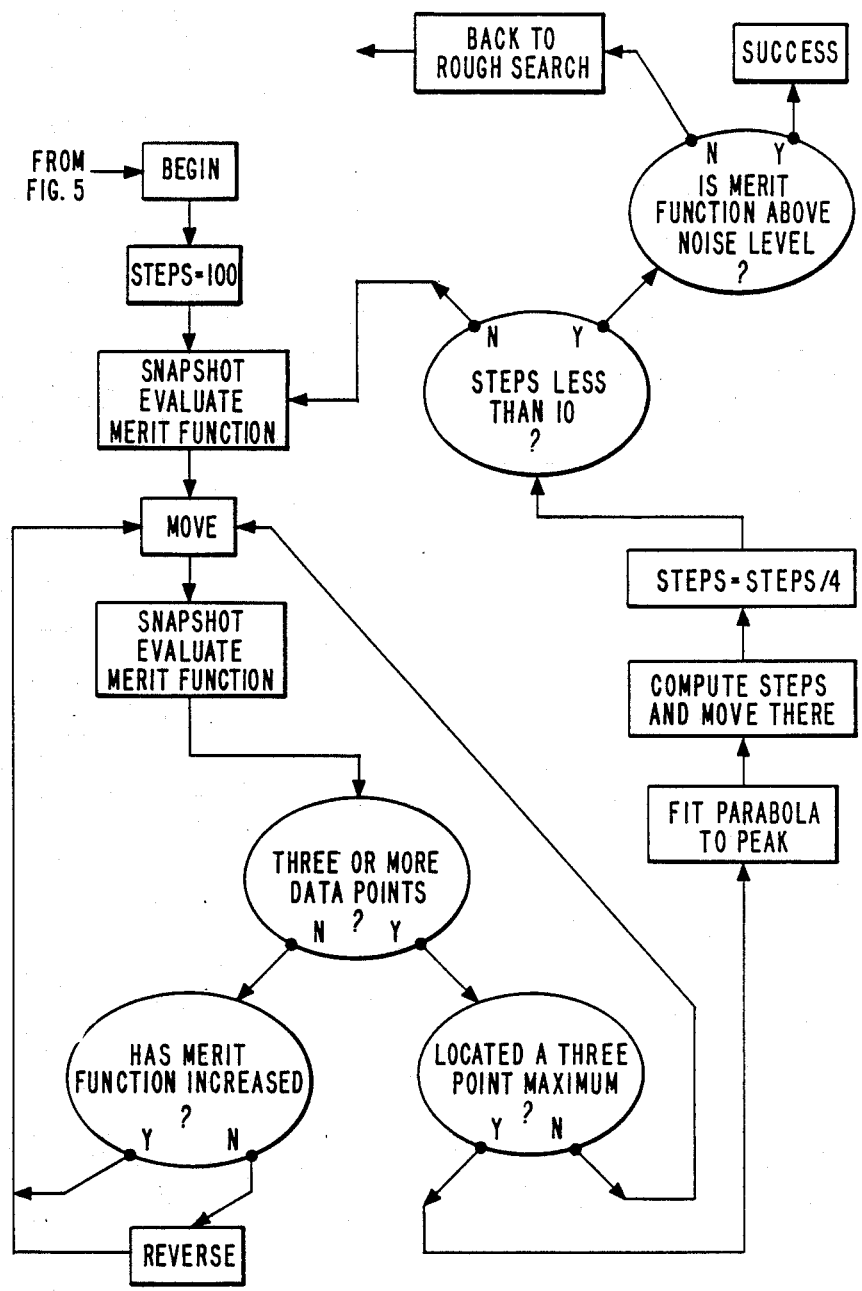

If the merit function is above the noise level, the system moves to the fine search mode of FIG. 8. In FIG. 8, the motor increments 100 steps, takes a snapshot, evaluates the merit function, and determines if three data points are in the summation comparator 54. If not, it determines if the merit function has increased and follows the chart of FIG. 8.

If less than three data points are present in the comparator 54 the system determines whether or not successive merit functions increase in value. If they increase in value then the computer moves the camera in a way to further increase the value in the same direction until three data points are collected. If the merit function decreases after the first move after the point above the noise level is reached, then the motor reverses direction, another snap shot is taken and another point collected. If the merit function increases the motor moves the camera in the same direction until three data points are collected. Upon locating three data points of an increasing curve the curves are fitted to a parabola by computer 56. The position of the peak of the parabola is than calculated by computer 56. The computer 56 computes the number of motor 36 steps required to get to that peak position and then increments the camera to that position.

A last test is to determine if it takes less than 10 steps to reach the peak. If the peak is reached in 10 steps, it is assumed that the merit function maximum has been reached if the merit function is above the noise level. If it is, the system stops. If it is not above the noise level, then a false peak has been reached and the system returns to the rough search. The step amplitudes to reach the peak are the normal displacement steps divided by 4. If it requires more than 10 steps to reach the peak, the system takes an additional snap shot and repeats the process described above in the fine search. The reason for fitting the maximum merit function to a parabola is that the peak level of the merit function tends to be relatively flat and the merit function may decrease somewhat intermediate the actual peak point. The fitting of the merit function to a parabola tends to avoid the shortcomings of intermediate depressions in the value of the merit function which otherwise would be sensed in the small step increments.

Assume during the search routine for the peak of the merit function, as illustrated in FIG. 8, that an intermediate spurious peak is reached. Suppose in that spurious peak the merit functions are approximately at the same value, for example, suppose they are respectively 100,500; 100,550 and 100,450 for first, second and third points. Computer 56 determines whether or not the three points differ in value by 1,000, that is, there is a difference in merit function value by 1,000. It has been found by experiment that three successive points in noise peaks do not differ by 1,000 in grey scale value. None of the differences among the three points differ by more than 1,000. Thus, the computer 56 causes motor 36 to continue to search for the merit function peak. During searching for the merit function peak, FIG. 8, the step labeled as merit function above noise level is a step which checks for the minimum 1,000 count difference in the merit function value for three successive points. Because the grey scale summation performed by summation 52 of FIG. 1 sums the grey scale values of image array 256×256 pixels in a grey scale range of 0 to 255 (at 8 bits/pixel), the maximum grey scale summation, i.e., the merit function, can be above 16,000,000.

In FIG. 4, a non-zero merit function is always obtained even in the presence of observing an object of uniform light intensity because of static (fixed) or stochastic (random) noise in the grey scale image. All noise sources contribute to the high-pass image (the image obtained after convolution), and some noise sources may contribute to the merit function. A base line level, however, it always present in the merit function curve. When partial focus is obtained, the merit function rises above a predetermined minimum level to a single unique global maximum. The merit function then descends below the minimum level to a possible series of secondary maxima, which may or may not occur, depending upon the nature of the object being observed. The secondary maxima occur only when the object is periodic in nature in one or both spatial directions (x, y), and occur on only one side of the principle maxima if spherical aberration is present in the focussing lens, which is usually the case. In the absence of primary spherical aberration, the secondary maxima will be symmetrical about the primary maxima, if the object possesses periodicity. The noise level is chosen so that only the primary or global maximum rises above this value. The choice of the noise level may be made automatically by programming the system accordingly.

The minimum merit function allowable that is above the noise level is determined by both the number of edges in the object and the light level incident upon the camera sensor 30. The sensor 30 light level is in turn determined by the object illumination, the magnification and the lens opening. The minimum merit function is programmed to be automatically adjusted in accordance with the picture content.

In many auto focus system, there is always the question of what object or objects to focus upon. This system is programmed to allow a user to create a window containing the desired object or objects, and then run the focus motor 36 through the entire range of focus at the initial step increment. The system finds the global maximum even if object periodicy is present, and returns to the position where the best global maximum was found, where a rough search routine begins. A window may or may not be necessary, depending upon the picture content. In one embodiment the system can default to a no window situation, with the user option for an arbitrary window by programming the control 42 accordingly.

The sequence of global search, rough search and fine search is made for each new scene content. Such scenes include all possible one or two dimensional periodicities. A global search routine is used for expediting auto-focus only when the scene is known to contain periodicities. The rough search routine is used for expediting fine auto focus when there is moderate change in scene. In the latter case, for example, moving of the camera or an object in the scene may cause a moderate scene change. Optimum focus may be obtained in this case without the need for a global search, thereby significantly reducing the focus time. This proves useful in optical metrology when the camera may be scanned over a tilted or curved object.

When the merit function is below a predetermined minimum level, a rough zig-zag search is performed until either an increase above the minimum level is found, by an amount allowing for noise in the merit function or until a limit switch is encountered. Movement is made to the center of the step-in movement equal in distance from both limit switches.

Once a merit function is above the predetermined minimum level as determined by the noise level, the fine search mode is entered. This mode seeks to fit a parabola to the single global maximum, step to the maximum of that parabola, reduce the fixed number of steps used in the fine search and repeat until focus is achieved. The camera is first moved in a fixed number of steps in the same direction as that used to enter the fine search mode. With the merit function originally above the minimum level, the initial movement direction is arbitrary. In either case the motion is always reversed if the merit function decreases below the value of the prior stepped position by an amount greater than the allowed noise level in the merit function. While a Laplacian cross convolution of a matrix of 7×7 is used in the present implementation other matrices may be employed in other implementations.

The grey scale resolution in the present embodiment is about eight bits and this is within the capability of normally available vision processors. The convolutions provide edge detection that in essence generate a first derivative of a digitized image. Prior experiments providing a summation of a first derivative of the digitized image produced a summation value which did not lend to automatic focussing. That is, the system could not automatically focus by merely summing the first derivative operation performed by convolution operator 48. However, upon performing the non-linear grey scale transformation in the digitized image in memory 46, that transformation is sufficient to produce grey level summation values which are sufficiently different than that produced by the convolution operator 48 such that a focussing operation is successfully performed. In FIG. 4, the distance d represents about 1 mil of camera displacement. The merit function width at the noise level is approximately 100 times that value.

What is claimed is:

1. An automatic focussing system comprising:
   imaging means for producing a signal representative of an image of an object spaced from the imaging means, said imaging means having a given focus state relative to the object;
   signal processing means for generating a grey scale summation value of at least a portion of the image, said processing means distorting the grey scale values of said image so that said summation value tends to be a function of said focus state;
   means for periodically changing the focus state of said imaging means and for causing said processing means to produce successive grey scale summation values representing successive different corresponding focussing states of said imaging means; and
   comparison means for comparing said successive summation values and for causing said imaging means to be placed in a focus state in which the grey scale summation values of said successive focussing states increase to a maximum;
   said signal processing means including means for digitizing said image a frame at a time and for dividing each said image frame into a plurality of pixels, each pixel having a given grey scale value, said grey scale distorting including non linear transformation of each said image frame to change the grey scale values of certain of said pixels having a grey scale value in a certain threshold range and means for convolving each said frame with a high pass spatial filter prior or said distorting.

2. The system of claim 1 wherein said high-pass spatial filter is a two-dimensional high-pass spatial filter.

3. The system of claim 1 wherein said imaging means includes a video camera for generating a video signal manifesting said given focus state, said signal processing means including analog-to-digital converter means for digitizing said video signal and means for storing said digitized signal one frame at a time.

4. The system of claim 3 wherein said processing means includes means for convolving each digitized frame, means for grey scale non-linear transforming said convoluted digitized frame in a monotonically non-decreasing relationship of input grey scale values to output grey scale values, and means for summing the grey scale values of said non-linear transformed frame.

5. The system of claim 1 wherein said comparison means includes means for changing the focus states of said imaging means in increments of such value to avoid false summation peaks.

6. The system of claim 5 wherein said comparison means includes means for storing the values of three successive summation values and for curve fitting said these values to a parabola to determine the maximum summation value.

7. In an optical apparatus including optical means for projecting an image of an object from an object plane to an image plane, image pickup means adapted to provide an image signal representative of the projected image at the image plane, and means responsive to a control signal for changing the focus state of the optical means, an automatic focus control system comprising:
   means responsive to said image signal applied as an input thereto for generating a digitized image representation of at least a portion of the projected image, said digitized image representation comprising a plurality of separate image pixels each having a given grey scale value in a given grey scale range;
   high-pass filtering means for filtering the digitized image representation;
   non-linear grey scale transform means for changing the grey scale value of those pixels whose grey scale value is in a predetermined range of values;
   means for summing the grey scale values of all pixels in said digitized image representation to produce a signal representing the grey scale summation value; and
   means responsive to said grey scale summation signal applied thereto for generating said control signal to incrementally change the focus state of said optical means until the grey scale summation value is a maximum.

8. The system of claim 7 wherein said predetermined range is in the lowermost end of said grey scale values.

9. The system of claim 7 wherein said means for generating said image representation include means for generating said image representation subsequent to the incremental change of said optical means focus state for each of a plurality of successive states.

10. The system of claim 7 wherein said means for generating a digitized image representation includes means for digitizing a plurality of successive single video frames, each frame corresponding to and resulting in the generation of a given grey scale summation value, said means for generating said control signal including means for comparing the grey scale summation values of said successive frames, and for changing the focus state of said optical means in a direction to increase the grey scale summation value of said successive frames.

11. The system of claim 7 wherein said apparatus includes a video camera and means for varying the relative position of the optical means, said latter means including drive means for displacing the camera, said means for generating said control signal including means for causing the camera to incrementally displace in a direction to cause successive grey scale summation values for each incremental displacement to increase in value, said system including means for automatically generating said digitized image representation after each said incremental displacement.

12. The system of claim 7 wherein said high-pass filtering means includes means for generating a Laplacian cross convolution of said digitized image representation.

13. The system of claim 12 wherein said convolution generating means includes means for replacing each pixel in each image representation with a linear summation over a region surrounding that pixel according to the equation:

$$Q(i,j) = \sum_{(h,k)=-(n-1)/2}^{+(n-1)/2} C(h,k)*P(i+h, j+k) \quad (1)$$

for all (i,j), and all (h,k), in an n×n region surrounding (i,j), where i and h are pixel row numbers and j and k are pixel column numbers, P is the original image pixel, n is an odd integer, Q is the image pixel resulting from the convolution, and C is the coefficient matrix defining the convolution, the region surrounding the pixel P being centered on P, and may be any region which includes the same odd number of pixels in both the x and y directions.

14. The system of claim 7 wherein said transform means includes means for replacing each pixel in the image representation with an arbitrary function of that pixel according to the equation:

Q(i,j)=F[P(i,j))]

for all (i,j), where i is the pixel row number and j is the pixel column number, P is the original pixel and Q is the resultant pixel.

15. An automatic focussing system comprising:
imaging means for projecting an object image at an object plane onto an image plane;
image storing means for digitizing and storing at least a portion said image at said image plane, said digitizing forming said stored image into a plurality of pixels;
filtering means for high-pass filtering said stored digitized image;
non-linear grey scale transform means for changing the grey scale value of those pixels of the filtered image whose grey scale pixel values are in a given grey scale range of values;
grey scale summation means for summing the grey scale values for all said pixels of said filtered and transformed image;
focal adjustment means for periodically changing the focus state of said imaging means; and
means for comparing successive summed grey scale values and for causing said focal altering means to change the focus state of the imaging means in a direction such that the summed grey scale values tend to increase in value with successive displacements.

16. The system of claim 15 wherein said summed grey scale values tend to have false peaks intermediate the minimum and maximum values of said grey scale summed values, said means for comparing including means for ignoring said false peaks.

17. The system of claim 15 wherein said imaging means comprises a video camera, said focal adjustment means including means for displacing said camera relative to said object plane.

18. The system of claim 15 wherein said filtering means comprises Laplacian cross convolution means for convolving said stored image and wherein said transform means includes means for reducing to a value of substantially zero the grey scale values of those pixels which are below a given threshold value.

19. The system of claim 15 wherein said focal adjustment means includes first means for coarsely incrementing said imaging means in first displacement increments until said summed grey scale values approach a given maximum range and for finely incrementing said imaging means in second displacement increments smaller than the first displacement increments until a maximum value is reached.

20. A system for automatically focussing a video camera on an object comprising:
a video camera movably secured to a support and adapted to produce a video signal having a given focus state according to the relative position of the camera to an object;
means for digitizing said video signal into a plurality of pixels;
means for successively storing said digitized signal one frame at a time;
means for high-pass spatial filtering each said stored digitized frame;
means for grey scale distorting each said high-pass filtered frame;
means for summing the grey scale values of all pixels in at least a portion of each said convoluted grey scale distorted frame and for storing the summation value;
means for periodically displacing the camera to cause the camera to be placed in different focussed states, each frame corresponding to and representing a different state;
said means for storing the summation value including means for storing a plurality of successive summation values corresponding to the different successive focussed states;
means for determining when the grey scale summation value of a frame is above a given threshold; and
means for comparing said successive stored summation values when said grey scale summation value is above said given threshold for displacing said camera in a direction to maximize said grey scale summation values.

* * * * *